United States Patent
Chen et al.

(10) Patent No.: US 6,813,660 B2
(45) Date of Patent: Nov. 2, 2004

(54) WIRELESS PORTABLE ELECTRONIC DEVICE CAPABLE OF RECEIVING

(75) Inventors: Shoei Lai Chen, Taipei Hsien (TW); Chung Ping Chi, Chung Ho (TW)

(73) Assignee: Topseed Technology Corp., Taipei Hsien (TW)

( * ) Notice: Subject to any disclaimer, the term of this patent is extended or adjusted under 35 U.S.C. 154(b) by 21 days.

(21) Appl. No.: 10/147,042

(22) Filed: May 17, 2002

(65) Prior Publication Data

US 2003/0217205 A1 Nov. 20, 2003

(51) Int. Cl.[7] ................................................ G06F 13/14
(52) U.S. Cl. ...................... 710/62; 455/420; 455/556; 455/563; 379/67.1
(58) Field of Search ........................... 710/62; 455/420, 455/556, 537, 563; 379/67.1

(56) References Cited

U.S. PATENT DOCUMENTS

| | | | | |
|---|---|---|---|---|
| 5,590,414 A | * | 12/1996 | Marui et al. | 455/569.2 |
| 5,864,708 A | * | 1/1999 | Croft et al. | 710/1 |
| 6,301,513 B1 | * | 10/2001 | Divon et al. | 700/94 |
| 6,308,062 B1 | * | 10/2001 | Chien et al. | 455/420 |
| 6,463,129 B1 | * | 10/2002 | Park | 379/67.1 |
| 2003/0163634 A1 | * | 8/2003 | Kim | 711/103 |

* cited by examiner

*Primary Examiner*—Rehana Perveen
(74) *Attorney, Agent, or Firm*—Rosenberg, Klein & Lee

(57) ABSTRACT

A portable device capable of storing data and receiving signals is provided. The portable device includes a connecting interface, an access circuit for implementing read or write commands, a memory device electrically connected to the access circuit for storing data, wherein the memory device receives the read or write commands from the access circuit, a receiving circuit for receiving a radio signal, and a control circuit electrically connected to the connecting interface. The control circuit controls the read or write commands and receives the radio signal transferred from the receiving circuit The control circuit transfers data through the connecting interface.

6 Claims, 4 Drawing Sheets

USER

WIRELESS PORTABLE ELECTRONIC DEVICE CAPABLE OF RECEIVING

BACKGROUND OF THE INVENTION

1. Field of the Invention

The present invention relates to a wireless portable electronic device capable of receiving signals and storing data. More particularly, the present invention relates to a portable memory device incorporating a wireless signal receiving function.

2. Description of the Prior Art

Universal Serial Bus, or USB, is a computer standard designed to eliminate the guesswork in connecting peripherals to PCs. The USB standard allows new peripherals to be configured automatically upon attachment without the need to reboot or run setup. USB provides ease of use by supporting Plug and Play, which allows peripherals to be correctly detected and configured automatically as soon as they are physically attached to the bus. Hot swap allows the addition and removal of devices at any time, without powering down or rebooting.

As the USB data transmission speed promotes, some portable memory devices with vast memory capacity such as removable disk emerges on the market. People can store a great deal of information in a single portable memory device without the need of carrying a notebook. Data or documents for a presentation can be stored in the portable memory device. When one needs to make a presentation, the portable memory device is typically connected to a computer and a projector. The information stored in the portable memory device may be read by the computer and projected onto a screen. However, when the person who is making the presentation needs to go on the next page of his document, he must use the keyboard connected to the computer. Sometimes, the computer is near the projector because the limited length of the signal cable and is therefore far from the speaker who is making the presentation. One approach is setting an assistant to operate the computer. This arises another problem that not every conference site offers such assistant.

Consequently, there is a strong need to provide a device capable of storing data and receiving signals to solve the above mentioned problem. When making a presentation, a speaker can simply use a remote control to implement paging or line switching functions, thereby improving the efficiency.

SUMMARY OF THE INVENTION

It is a primary object of the present invention to provide a wireless portable electronic device capable of receiving signals and storing data.

According to the claimed invention, a portable device capable of storing data and receiving signals is provided. The portable device includes a connecting interface, an access circuit for implementing read or write commands, a memory device electrically connected to the access circuit for storing data, wherein the memory device receives the read or write commands from the access circuit, a receiving circuit for receiving a radio signal, and a control circuit electrically connected to the connecting interface. The control circuit controls the read or write commands and receives the radio signal transferred from the receiving circuit The control circuit transfers data through the connecting interface.

It is to be understood that both the forgoing general description and the following detailed description are exemplary, and are intended to provide further explanation of the invention as claimed. Other advantages and features of the invention will be apparent from the following description, drawings and claims.

DETAILED DESCRIPTION OF THE PREFERRED EMBODIMENT

Figure 1:
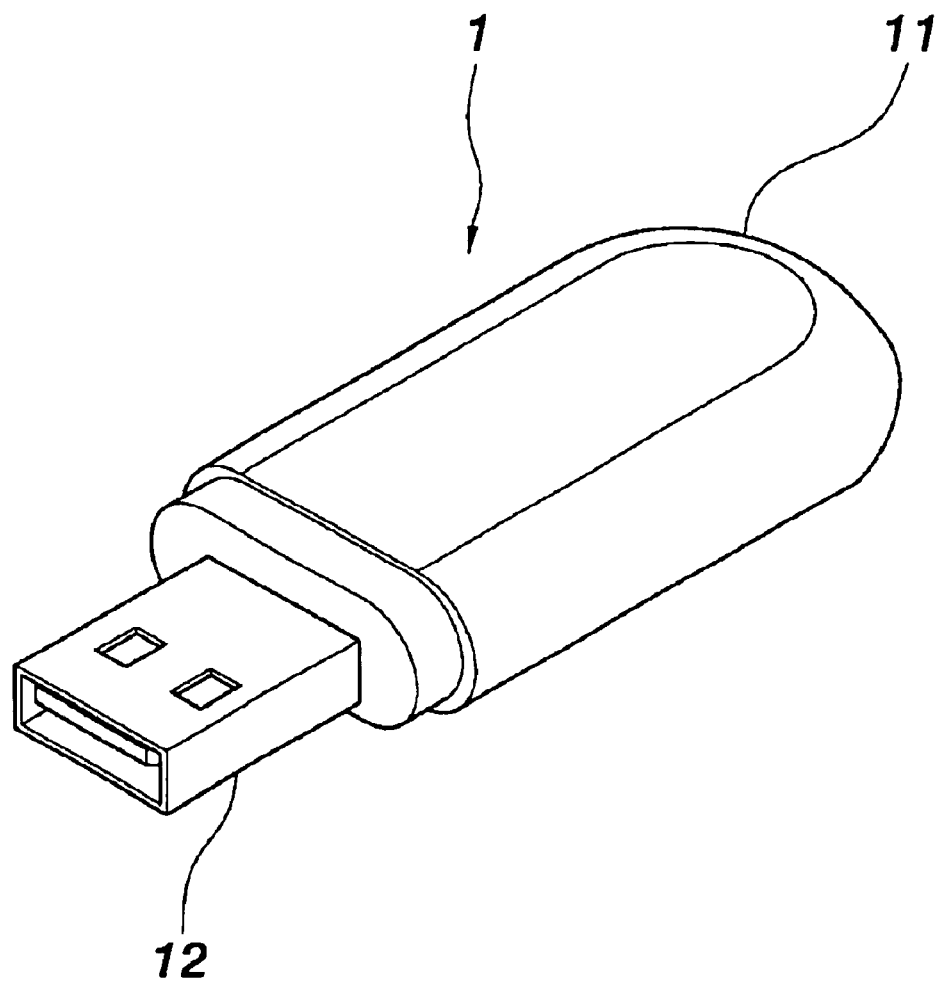
FIG. 1 is a typical view of this invention.

Please refer to FIG. 1. FIG. 1 is a typical view of this invention. This invention provides a portable wireless device capable of receiving signals and storing data. As shown in FIG. 1, a portable device 1 comprises a casing 11 and a connecting interface 12 provided at a front side of the casing 11. An electrical circuit that provides the functions of receiving signals and storing data (not shown) is installed in the casing 11. The portable device 1 is small in size and easy to carry.

Figure 2:
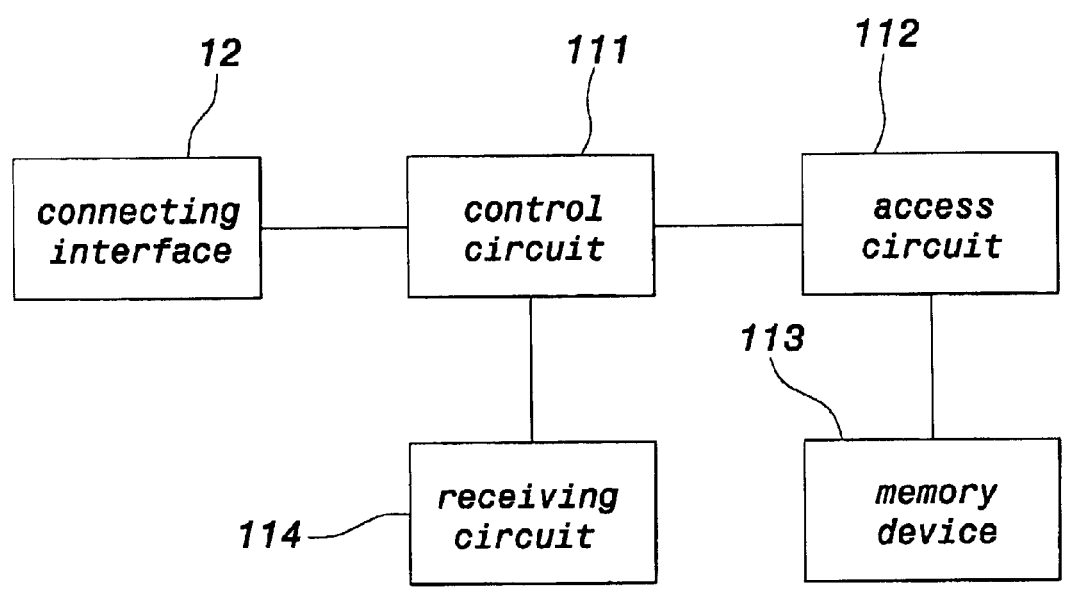
FIG. 2 is a block diagram showing the circuit components of this invention.
Figure 3:
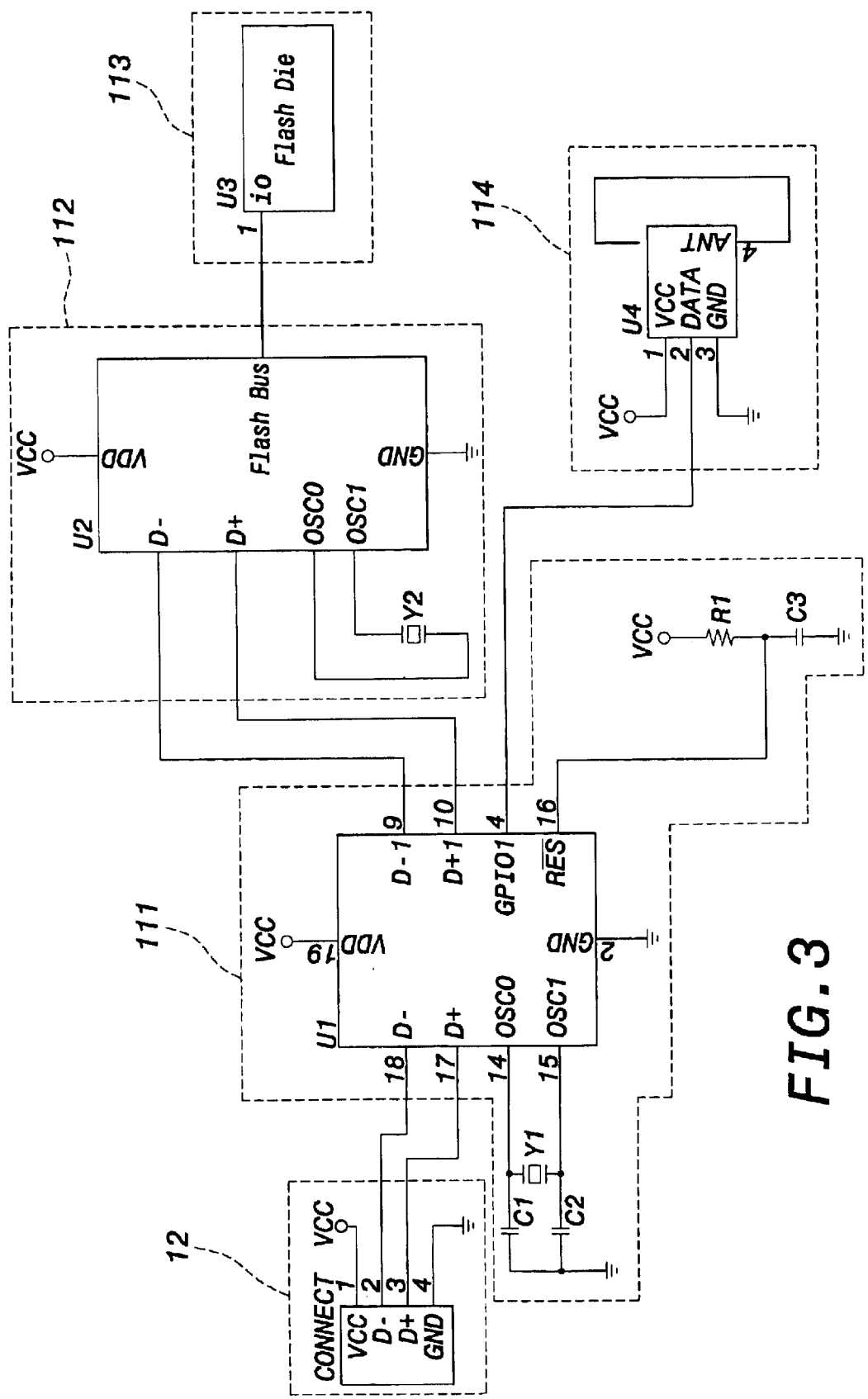
FIG. 3 is a circuit diagram according to this invention.

Please refer to FIG. 2 and FIG. 3. FIG. 2 is a block diagram showing the circuit components of this invention. FIG. 3 is a circuit diagram according to this invention. As shown in FIG. 2, The portable device 1 of this invention comprises connecting interface 12, a control circuit 111, an access circuit 112, a memory device 113, and a signal receiving circuit 114. The connecting interface 12 is an USB-based data transmission interface. In use, the portable device 1 is connected to an USB connecting port of an electric apparatus such as a PC through the connecting interface 12. As shown in FIG. 2 and FIG. 3, the control circuit 111 is electrically connected to the connecting interface 12. The control circuit 111 comprises a microprocessor U1, quartz crystal Y1, capacitors C1~C3, and resistor R1. Data transmission is carried out through the connecting interface 12 between the electrical apparatus and the portable device 1. The access circuit 112 is electrically connected to the control circuit 111. The access circuit 112 comprises a chip U2 and a quartz crystal Y2. The access circuit 112 is controlled by the control circuit 111 to implement read or write commands. The memory device 113, which is read or wrote data by the access circuit 112, is electrically connected to the access circuit 112. Preferably, the memory device 113 is nonvolatile flash memory U3. Data stored in the memory device 113 may be flames, excel charts, graphic information, Microsoft word files or the like. The receiving circuit 114 is electrically connected to the control circuit 111. The receiving circuit 114 is comprised of a radio signal receiving chip U4. A radio signal is received by the chip U4 and then transferred to the control circuit 111. After processing the radio signal by the control circuit 111, the processed signal is then output to the electrical apparatus that is connected to the portable device 1 through the connecting interface 12. The control circuit 111, access circuit 112, memory device 113, and receiving circuit 114 are installed in the casing 11.

With reference to features depicted in FIG. 2, a handy portable wireless device capable of receiving signals and storing data can be obtained. The access circuit 112 is in charge of reading or writing data of the memory device 113. The receiving circuit 114 is in charge of receiving radio signals and passing the radio signals to the control circuit 111. After processing the radio signal by the control circuit 111, the processed signal is then output to the electrical apparatus such as a PC that is connected to the portable device 1 through the connecting interface 12.

Figure 4:
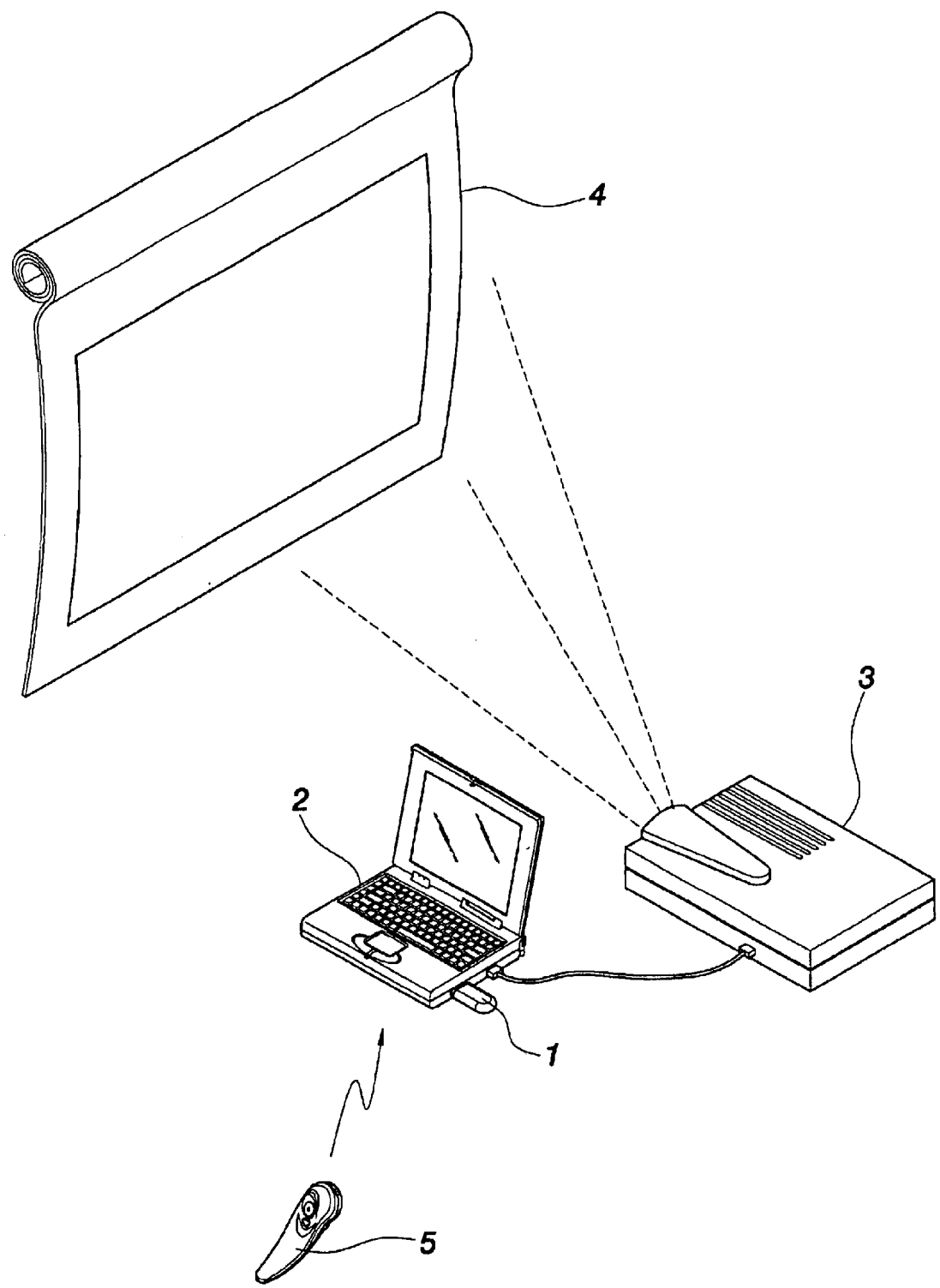
FIG. 4 is a schematic diagram illustrating the use of the present invention.

Please refer to FIG. 4. FIG. 4 is a schematic diagram illustrating the use of the present invention. As shown in FIG. 4, when one is making a presentation, he or she connects the portable wireless device 1 with a notebook 2 that is connected to a projector 3. The flames shown on the monitor of the notebook 2 is projected onto a screen 4 by the projector 3. The data stored in the portable wireless device 1 mat be excel charts, graphic information, Microsoft word files or the like. The user can control paging or line switching by using a remote control 5 that generals a radio signal to the portable wireless device 1.

Briefly, it is advantageous to use the present invention since the present invention includes the following features:

(1) The portable wireless device 1 has a dual-function of receiving signals and storing data.

(2) The connecting interface is USB connector. Hence, fast installation of the portable wireless device 1 is completed by Plug and Play.

Those skilled in the art will readily observe that numerous modification and alterations of the device may be made while retaining the teachings of the invention. For example, the receiving circuit 114 is not limited to receiving signals of the remote control. The receiving circuit 114 may also receive signals generated by other wireless peripherals such as wireless mice, wireless joysticks, or wireless keyboards. Accordingly, the above disclosure should be construed as limited only by the metes and bounds of the appended claims.

What is claimed is:

1. A portable device capable of storing data and receiving signals, comprising:

a casing;

a USB connecting interface extending from one end of the casing for coupling to a mating USB connecting port of a computer, the casing being supported by the mated USB connecting interface and USB connecting port of the computer;

a memory device disposed in the casing;

an access circuit disposed in the casing and coupled to the memory device for implementing read and write commands therefore;

a control circuit disposed in the casing and electrically connected to the connecting interface and the access circuit for controlling the reading and writing commands; and a receiving circuit disposed in the casing and connected to the control circuit for communicating received radio signals to the control circuit, the control circuit transferring data between the memory device and the computer through the connecting interface responsive to received commands transferred from the receiving circuit.

2. The portable device of claim 1 wherein the memory device is a flash memory.

3. The portable device 1 of claim 1 wherein the radio signal is generated by a remote control.

4. A portable device capable of storing data and receiving signals, the portable device being connected to a USB connector of an electric apparatus, the portable device comprising:

a casing;

a connecting interface formed on a front end of the casing for coupling to the USB connector of the electric appliance;

a memory device disposed in the casing;

an access circuit disposed in the casing and coupled to the memory device for implementing read or write commands therefore;

a control circuit disposed in the casing and electrically connected to the connecting interface and the access circuit for controlling the reading and writing commands; and a receiving circuit disposed in the casing and connected to the control circuit for communicating received radio signals to the control circuit, the control circuit transferring data between the memory device and the electric appliance through the connecting interface responsive to received commands transferred from the receiving circuit.

5. The portable device of claim 4 wherein the memory device is a flash memory.

6. The portable device of claim 4 wherein the radio signal is generated by a remote control.

* * * * *